United States Patent
Ikku et al.

(10) Patent No.: US 12,472,585 B2
(45) Date of Patent: Nov. 18, 2025

(54) ADJUSTMENT METHOD OF LASER PROCESSING APPARATUS, AND LASER PROCESSING APPARATUS

(71) Applicant: DISCO CORPORATION, Tokyo (JP)

(72) Inventors: Yuki Ikku, Tokyo (JP); Jun Abatake, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 837 days.

(21) Appl. No.: 17/660,119

(22) Filed: Apr. 21, 2022

(65) Prior Publication Data

US 2022/0339737 A1   Oct. 27, 2022

(30) Foreign Application Priority Data

Apr. 23, 2021   (JP) .................................. 2021-073242

(51) Int. Cl.
  *B23K 26/359*   (2014.01)
  *B23K 26/03*   (2006.01)
  (Continued)

(52) U.S. Cl.
  CPC .......... *B23K 26/359* (2015.10); *B23K 26/032* (2013.01); *B23K 26/0676* (2013.01); *B23K 2103/56* (2018.08)

(58) Field of Classification Search
  CPC ............ B23K 2103/56; B23K 26/0676; B23K 26/032; B23K 26/359
  (Continued)

(56) References Cited

U.S. PATENT DOCUMENTS

2007/0146708 A1* 6/2007 Hagiwara ............. G03F 9/7076
  356/401
2011/0240617 A1* 10/2011 Xu .......................... B23K 26/38
  219/121.72
(Continued)

FOREIGN PATENT DOCUMENTS

JP       2006-051517 A       2/2006
JP       2019111542 A   *   7/2019   ......... B23K 26/0648
(Continued)

OTHER PUBLICATIONS

Office Action issued in counterpart Japanese patent application No. 2021-073242, dated Aug. 27, 2024.
(Continued)

*Primary Examiner* — Jimmy Chou
(74) *Attorney, Agent, or Firm* — Greer Burns & Crain Ltd.

(57) ABSTRACT

An adjustment method of a laser processing apparatus includes a spatial light modulator adjustment step of adjusting a spatial light modulator into a state ready for splitting a laser beam emitted from a laser oscillator and applying a plurality of laser beams such that laser beams will have a desired positional relation, a processing mark formation step of operating the laser oscillator to apply the laser beams to a wafer such that a plurality of processing marks is formed, an imaging step of stopping the laser oscillator, and imaging the processing marks formed at the wafer, and an aberration correction step of correcting aberration of the condenser by comparing the desired positional relation and a positional relation among the imaged processing marks, and adjusting the spatial light modulator such that the positional relation among the processing marks conforms to the desired positional relation.

2 Claims, 3 Drawing Sheets

(51) Int. Cl.
*B23K 26/067* (2006.01)
*B23K 103/00* (2006.01)

(58) Field of Classification Search
USPC .................................................. 219/121.78
See application file for complete search history.

(56) References Cited

U.S. PATENT DOCUMENTS

2015/0355025 A1* 12/2015 Duffey ................ G03F 7/70041
    355/67
2016/0151857 A1* 6/2016 Odagiri .............. B23K 26/0853
    219/121.81
2020/0149961 A1* 5/2020 Hidaka ................ G01J 3/2823

FOREIGN PATENT DOCUMENTS

| JP | 2019147191 A | 9/2019 |
|----|--------------|--------|
| JP | 2020163472 A | 10/2020 |
| JP | 2020529925 A | 10/2020 |
| WO | 2019030520 A1 | 2/2019 |

OTHER PUBLICATIONS

Office Action issued in counterpart Taiwanese patent application No. 111114881, dated Aug. 8, 2025.

* cited by examiner

ADJUSTMENT METHOD OF LASER PROCESSING APPARATUS, AND LASER PROCESSING APPARATUS

BACKGROUND OF THE INVENTION

Field of the Invention

The present invention relates to an adjustment method of a laser processing apparatus for applying a laser beam to a workpiece held on a chuck table, and also to the laser processing apparatus.

Description of the Related Art

Wafers, each of which includes a plurality of devices such as integrated circuits (ICs) or large-scale integration (LSI) formed on a front surface thereof divided by a plurality of intersecting scribe lines, are divided into individual device chips by a laser processing apparatus, and the divided device chips are used in electronic equipment such as mobile phones or personal computers.

The laser processing apparatus includes at least a chuck table that holds each workpiece, a laser application unit that applies a laser beam to the workpiece held on the chuck table, and a feed mechanism that relatively feeds the chuck table and the laser application unit for processing, and can divide the wafer into individual device chips with high precision (see, for example, JP 2006-051517A).

SUMMARY OF THE INVENTION

Due to aberration of an optical system that makes up the laser application unit and includes a condenser, the laser processing apparatus however involves a problem that the wafer is reduced in processing accuracy when the laser beam is applied to perform laser processing, leading to a demand for the solution or alleviation of the problem.

The present invention therefore has as objects thereof the provision of an adjustment method of a laser processing apparatus, which can appropriately correct aberration of a condenser that constitutes an optical system of a laser application unit, and also of the laser processing apparatus.

In accordance with a first aspect of the present invention, there is provided an adjustment method of a laser processing apparatus including a chuck table that holds a workpiece, a laser application unit that applies a laser beam to the workpiece held on the chuck table, and a feed mechanism that relatively feeds the chuck table and the laser application unit for processing. The laser application unit includes a laser oscillator that emits the laser beam, a condenser that condenses and applies the laser beam that has been emitted from the laser oscillator to the workpiece held on the chuck table, a spatial light modulator arranged between the laser oscillator and the condenser, a spectrometer arranged between the condenser and the spatial light modulator, and a camera arranged on a side toward which light reflected at the workpiece is split by the spectrometer. The adjustment method includes a wafer providing step of providing, as the workpiece, a wafer at which processing marks are to be formed by the application of the laser beam, a holding step of holding the wafer on the chuck table, a spatial light modulator adjustment step of adjusting the spatial light modulator into a state ready for splitting the laser beam that has been emitted from the laser oscillator, and applying a plurality of laser beams such that the laser beams will have a desired positional relation, a processing mark formation step of operating the laser oscillator to apply the laser beams to the wafer held on the chuck table such that a plurality of processing marks is formed at the wafer, an imaging step of stopping the operation of the laser oscillator, and imaging by the camera the processing marks formed at the wafer held on the chuck table, and an aberration correction step of correcting aberration of the condenser by comparing the desired positional relation that serves as a reference for the adjustment in the spatial light modulator adjustment step and a positional relation among the processing marks imaged in the imaging step, and adjusting the spatial light modulator such that the positional relation among the processing marks conforms to the desired positional relation.

In accordance with a second aspect of the present invention, there is provided a laser processing apparatus including a chuck table that holds a workpiece, a laser application unit that applies a laser beam to the workpiece held on the chuck table, a feed mechanism that relatively feeds the chuck table and the laser application unit for processing, and a control unit. The laser application unit includes a laser oscillator that emits the laser beam, a condenser that condenses and applies the laser beam that has been emitted from the laser oscillator to the workpiece held on the chuck table, a spatial light modulator arranged between the laser oscillator and the condenser, a spectrometer arranged between the condenser and the spatial light modulator, and a camera arranged on a side toward which light reflected at the workpiece is split by the spectrometer. The control unit includes a spatial light modulator adjustment instructions section configured to adjust the spatial light modulator into a state ready for splitting the laser beam that has been emitted from the laser oscillator, and applying a plurality of laser beams such that the laser beams will have a desired positional relation, a processing mark formation instructions section configured to operate the laser oscillator to apply the laser beams to a wafer held as the workpiece on the chuck table such that a plurality of processing marks is formed at the wafer, an imaging instructions section configured to stop the operation of the laser oscillator, and to image by the camera the processing marks formed at the wafer held on the chuck table, and an aberration correction instructions section configured to correct aberration of the condenser by comparing the desired positional relation that has been instructed by the spatial light modulator adjustment instructions sections and a positional relation among the processing marks imaged by the camera, and adjusting the spatial light modulator such that the positional relation among the processing marks conforms to the desired positional relation.

According to the adjustment method of the first aspect of the invention for the laser processing apparatus, it is possible to solve the problem that the aberration of the optical system, which makes up the laser application unit and includes the condenser, reduces the processing accuracy of the wafer.

According to the laser processing apparatus of the second aspect of the invention, it is also possible to solve the problem that the aberration of the optical system, which makes up the laser application unit and includes the condenser, reduces the processing accuracy of the wafer.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

With reference to the attached drawings, a description will hereinafter be made in detail regarding a laser processing apparatus according to an embodiment of the second aspect of the present invention and an adjustment method according to an embodiment of the first aspect of the present invention for the laser processing apparatus.

Figure 1:
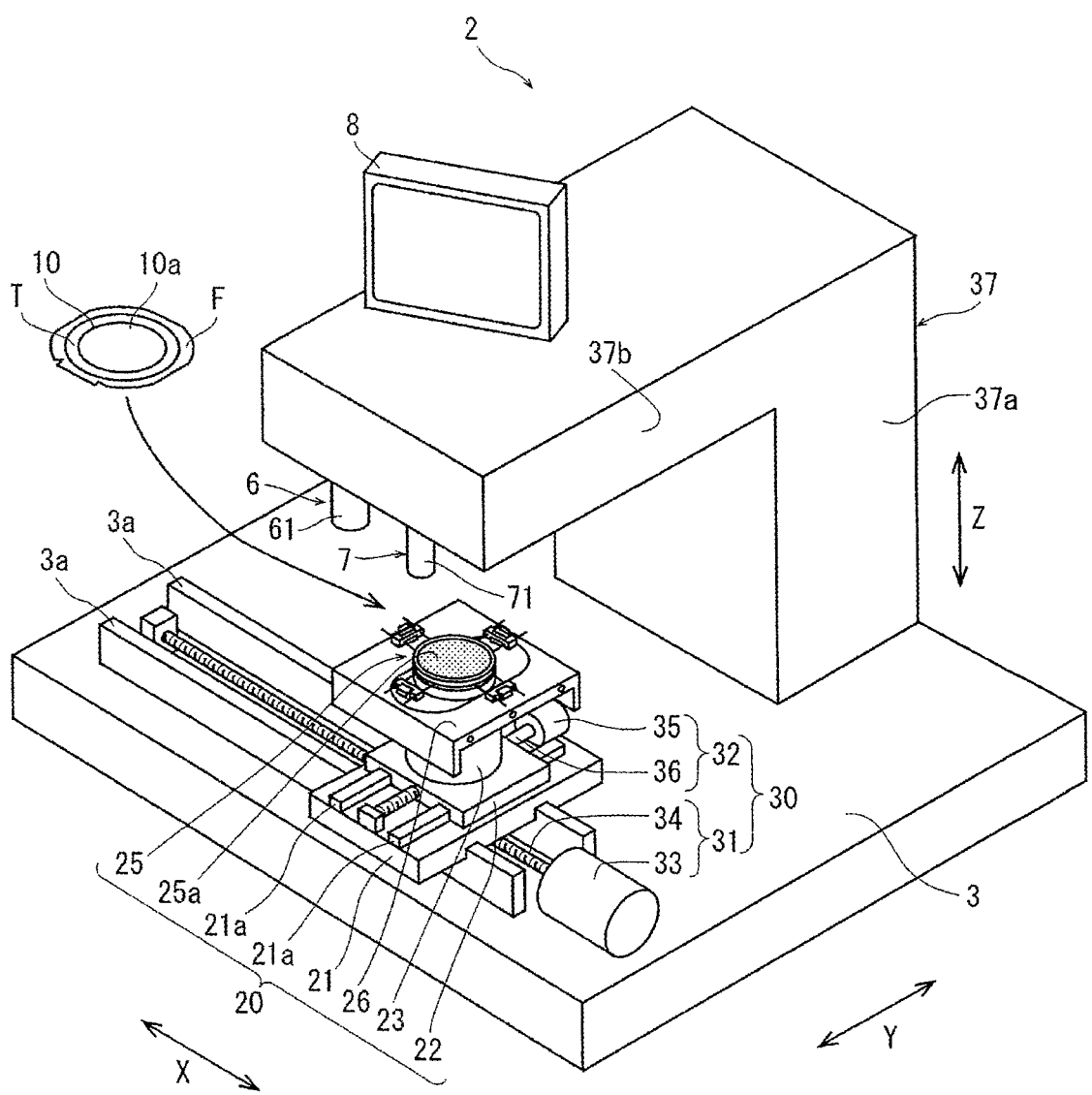
FIG. 1 is an overall perspective view of a laser processing apparatus according to an embodiment of a second aspect of the present invention.

FIG. 1 is an overall perspective view of a laser processing apparatus 2 according to this embodiment. In the adjustment method according to this embodiment to be performed by the laser processing apparatus 2 of this embodiment, a disc-shaped test wafer 10 is processed as a workpiece as depicted in FIG. 1. The wafer 10 is to be formed with processing marks by application of laser beams LB which will be described subsequently herein. For example, the wafer 10 is coated on a front surface 10a thereof with tin (Sn) and is supported on an annular frame F via an adhesive tape T.

The laser processing apparatus 2 includes at least a chuck table 25 disposed as holding means for holding the wafer 10, a laser application unit 6 that applies the laser beams LB to the wafer 10 held on the chuck table 25, a feed mechanism 30 that relatively feeds the chuck table 25 and the laser application unit 6 for processing, and a control unit 100 (see FIG. 2) which will be described subsequently herein.

In addition to the above-described elements, the laser processing apparatus 2 of this embodiment also includes an alignment unit 7 that images the wafer 10 and detects positions to be processed, and a display unit 8.

A chuck table mechanism 20 with the chuck table 25 included therein further includes a rectangular X-axis direction movable plate 21 mounted movably in an X-axis direction on a bed 3, a rectangular Y-axis direction movable plate 22 mounted movably in a Y-axis direction along guide rails 21a on the X-axis direction movable plate 21, a cylindrical post 23 fixed on an upper surface of the Y-axis direction movable plate 22, and a square cover plate 26 fixed on an upper end of the post 23. The chuck table 25 is a circular member extending upward through an elongated slot formed in the cover plate 26 and is configured to be movable by undepicted rotary drive means. The chuck table 25 includes a holding surface 25a formed from a porous material having permeability and defined by the X-axis direction and the Y-axis direction. The holding surface 25a is connected to undepicted suction means by way of a flow channel extending through the post 23. It is to be noted that the X-axis direction is a direction indicated by an arrow X in FIG. 1 while the Y-axis direction is a direction indicated by arrow Y in FIG. 1 and orthogonal to the X-axis direction. A plane defined by the X-axis direction and the Y-axis direction is substantially horizontal.

The feed mechanism 30 includes an X-axis moving mechanism 31 and a Y-axis moving mechanism 32. The X-axis moving mechanism 31 relatively moves and feeds the chuck table 25 and the laser application unit 6 in the X-axis direction for processing. The Y-axis moving mechanism 32 relatively moves the chuck table 25 and the laser application unit 6 in the Y-axis direction. The X-axis moving mechanism 31 has a ball screw 34 extending in the X-axis direction on the bed 3 and a motor 33 connected to one end portion of the ball screw 34. A nut portion (depiction of which is omitted) of the ball screw 34 is formed on a lower surface of the X-axis direction movable plate 21. Therefore, the X-axis moving mechanism 31 converts rotary motion of the motor 33 into linear motion by the ball screw 34, transmits the linear motion to the X-axis direction movable plate 21, and advances or retracts the X-axis direction movable plate 21 in the X-axis direction along guide rails 3a on the bed 3. On the other hand, the Y-axis moving mechanism 32 has a ball screw 36 extending in the Y-axis direction on the X-axis direction movable plate 21 and a motor 35 connected to one end portion of the ball screw 36. A nut portion (depiction of which is omitted) of the ball screw 36 is formed on a lower surface of the Y-axis direction movable plate 22. Therefore, the Y-axis moving mechanism 32 converts rotary motion of the motor 35 into linear motion by the ball screw 36, transmits the linear motion to the Y-axis direction movable plate 22, and advances or retracts the Y-axis direction movable plate 22 in the Y-axis direction along the guide rails 21a on the X-axis direction movable plate 21.

On a rear side of the chuck table mechanism 20, a frame body 37 is disposed upright including a vertical wall portion 37a which extends in an up-down direction (Z-axis direction) from an upper surface of the bed 3 and a horizontal wall portion 37b which extends horizontally. In the horizontal wall portion 37b, an optical system of the laser application unit 6 and the alignment unit 7 is accommodated. On a lower surface of a distal end of the horizontal wall portion 37b, a condenser 61 that constitutes the laser application unit 6 is arranged, and at a position spaced in the X-axis direction from the condenser 61, an objective lens 71 of the alignment unit 7 is arranged. The above-described laser application unit 6 is means for applying the laser beams LB of wavelengths having absorptivity or transmissivity for the wafer 10, and in this embodiment, the above-described wavelengths are set and included in laser processing conditions under which ablation processing is to be applied to a film of tin (Sn) coated on the front surface 10a of the wafer 10. As the objective lens 71, an objective lens accommodated in a cylindrical casing is depicted by way of example in FIG. 1. The above-described alignment unit 7, a display unit 8, a feed mechanism 30, and so on are electrically connected to the control unit 100 (see FIG. 2) that controls the laser application unit 6 in this embodiment and are controlled based on instruction signals from the control unit 100 to perform laser processing on the wafer 10 and the adjustment method of the laser processing apparatus 2.

Figure 2:
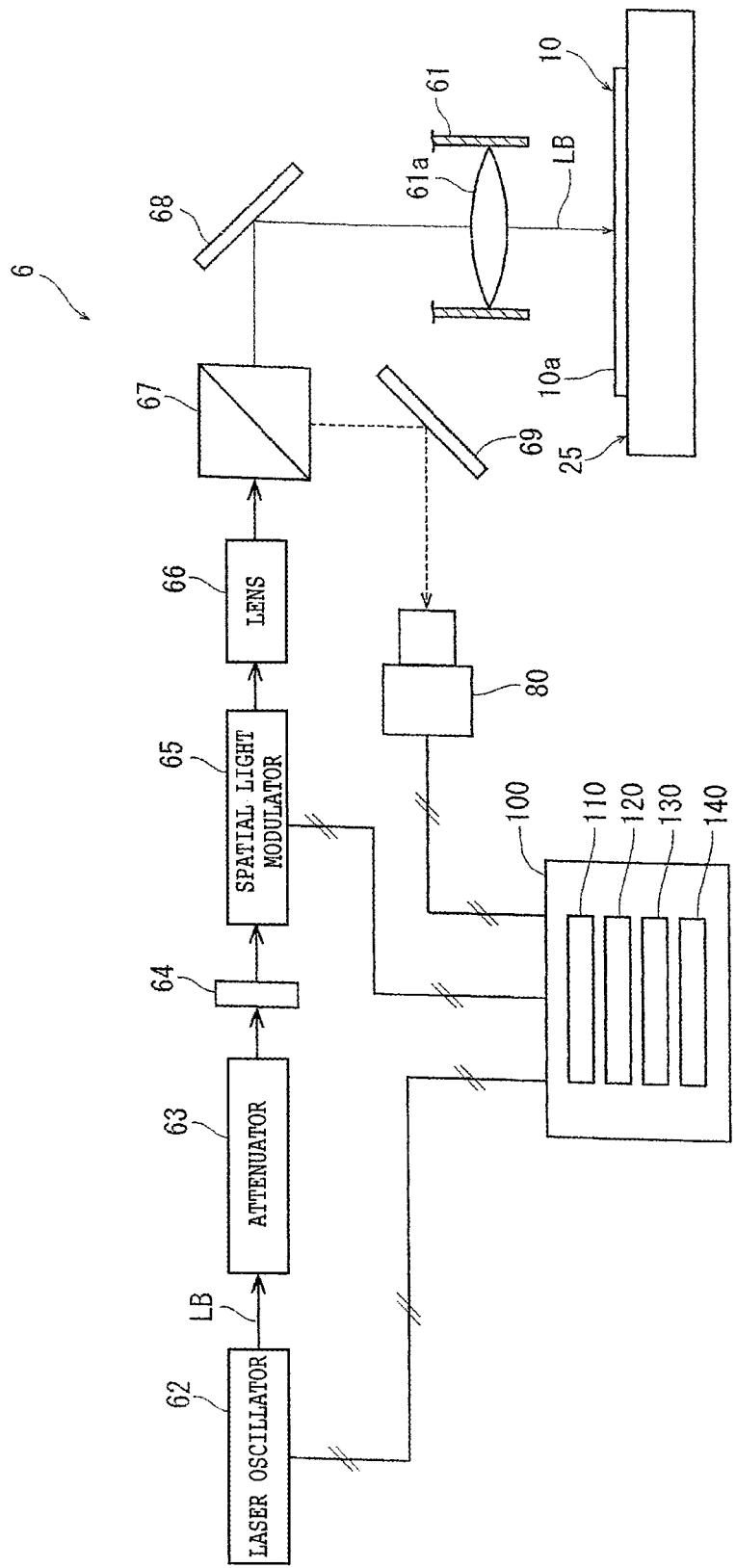
FIG. 2 is a block diagram illustrating an outline of a laser application unit mounted on the laser processing apparatus depicted in FIG. 1.

With reference to FIG. 2, a description will be made regarding the optical system of the laser application unit 6 in this embodiment. The laser application unit 6 includes at least a laser oscillator 62 that generates a laser output and emits a laser beam LB, the condenser 61 having a condenser lens 61a that condenses and applies the laser beam LB, which has been emitted from the laser oscillator 62, to the wafer 10, a spatial light modulator (SLM) 65 arranged between the laser oscillator 62 and the condenser 61, a spectrometer 67 arranged between the spatial light modulator 65 and the condenser 61, and a reflection mirror 69 arranged on a side toward which light reflected on the wafer 10 is split by the spectrometer 67. It is to be noted that the spatial light modulator 65 is constituted, for example, by a liquid crystal based (LC based) SLM but may also be constituted by a liquid crystal on silicon based (LCOS based) SLM.

As elements that may be further arranged as needed, the laser application unit 6 also includes an attenuator 63 that adjusts the output of the laser beam LB outputted from the laser oscillator 62, a polarizing plate 64 that adjusts a state of polarization of the laser beam LB outputted from the laser oscillator 62, a compound lens 66 including two convex lenses, and a reflection mirror 68 that reflects the laser beams LB from the spectrometer 67 and guides them to the side of the condenser 61.

Figure 3:
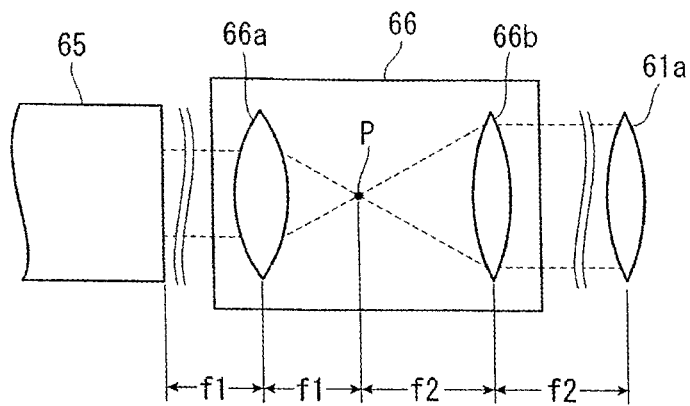
FIG. 3 is a schematic diagram illustrating an outline of a 4f optical system configured in the laser application unit illustrated in FIG. 2.

FIG. 3 is a concept diagram of a 4f optical system configured in the laser application unit 6 in this embodiment and including the above-described compound lens 66. The compound lens 66 in the 4f optical system in this embodiment includes a first convex lens 66a and a second convex lens 66b, and is configured such that a rear focal plane, which is located at a position of a distance f1 on a downstream side (on a side of the condenser lens 61a) as viewed from the first convex lens 66a, and a front focal point, which is located at a position of a distance f2 on an upstream side (on a side of the spatial light modulator 65) as viewed from the second convex lens 66b, coincide with each other at the position of a point P. An image which has been formed by the spatial light modulator 65 located at a position of the distance f1 on an upstream side of the first convex lens 66a is therefore precisely transferred (imaged) by the condenser lens 61a located at a position of the distance f2 on a downstream side of the second convex lens 66b. It is to be noted that the diagram illustrated in FIG. 3 is definitely conceptual and the lengths of the distance f1 and distance f2 presented in the diagram do not reflect their actual dimensional ratio.

The spectrometer 67 is what is called a beam splitter, and allows a portion of the laser beam LB incident from the compound lens 66 to transmit. The laser beam LB transmitted through the spectrometer 67 is changed in optical path by the reflection mirror 68 and is guided to a side of the condenser 61. Further, a portion of light reflected on the wafer 10 as the workpiece is guided to the spectrometer 67 through the condenser 61, is split at the spectrometer 67, and is then guided to and imaged by a camera 80 arranged on a side toward which the portion of the reflected light is split.

Referring back to FIG. 2 and continuing with the above-described laser application unit 6, the laser oscillator 62, the spatial light modulator 65, and the camera 80 are connected to the control unit 100. The control unit 100 includes a spatial light modulator adjustment instructions section 110, a processing mark formation instructions section 120, an imaging instructions section 130, and an aberration correction instructions section 140. The spatial light modulator adjustment instructions section 110 is configured to enable adjustment of the spatial light modulator 65, and, when adjusting the spatial light modulator 65 into a state ready for splitting the laser beam LB emitted from the laser oscillator 62 and applying a plurality of laser beams LB, to generate instruction signals to the special light modulator 65 such that the individual laser beams will have a desired positional relation. The processing mark formation instructions section 120 is configured to instruct operation of the laser oscillator 62 to apply the laser beams LB to the wafer 10 held on the chuck table 25 such that a plurality of processing marks is formed on the wafer 10. The imaging instructions section 130 is configured to stop the operation of the laser oscillator 62, and to instruct the camera 80 to image the processing marks formed on the wafer 10 held on the chuck table 25. The aberration correction instructions section 140 is configured to correct aberration of the condenser 61 by comparing the desired positional relation which has been instructed by the spatial light modulator adjustment instructions sections 110, and a positional relation among the actual processing marks imaged by the camera 80, and adjusting the spatial light modulator 65 such that the positional relation among the actual processing marks conforms to the desired positional relation. To the control unit 100, the display unit 8 is connected, thereby enabling the display unit 8 to present images captured by the above-described alignment unit 7 and camera 80, laser processing conditions, and the like.

The control unit 100 is configured by a computer and includes a central processing unit (CPU) that performs processing according to a control program, a read only memory (ROM) that stores the control program and the like, a random access memory (ROM) that permits read and write for temporary storage of acquired detection values, processing results, and the like, an input interface, and an output interface (illustration of details of which is omitted). The above-described spatial light modulator adjustment instructions section 110, the processing mark formation instructions section 120, the imaging instructions section 130, and the aberration correction instructions section 140 are configured by the control program, and are stored in the ROM of the control unit 100.

The laser processing apparatus 2 of this embodiment includes the configuration as generally described above, and the function and performance of the laser processing apparatus 2, and the embodiment of the adjustment method of the laser processing apparatus 2 will be described hereinafter.

First, a wafer providing step is performed to provide, as a workpiece, the wafer 10 on which processing marks will be formed by application of the laser beams LB. The wafer 10 for use in this embodiment is coated on the front surface 10a thereof with tin (Sn) as described based on FIG. 1. It is to be noted that the wafer for use in the adjustment method of the laser processing apparatus of the invention is not limited to the above-described wafer 10 coated on the front surface 10a thereof with tin and can be any wafer insofar as processing marks can be formed by application of the laser beam LB.

When the above-described wafer 10 has been provided, the wafer 10 is then placed and held on the holding surface 25a of the chuck table 25 (holding step). When holding the wafer 10 on the chuck table 25, the above-described suction means is actuated to hold the wafer 10 under suction on the holding surface 25a.

Next, the spatial light modulator adjustment instructions section 110 of the control unit 100 is operated to send, based on the desired positional relation 12a (see FIG. 4A) stored beforehand in the control unit 100, instruction signals to the spatial light modulator 65 and to adjust the spatial light modulator 65 into a state ready for splitting the laser beam LB which has been emitted from the laser oscillator 62 and applying the plurality of laser beams LB such that the laser beams LB will have the desired positional relation 12a (spatial light modulator adjustment step).

The processing mark formation instructions section 120 of the control unit 100 is then operated to perform a processing mark formation step that operates the laser oscillator 62 to apply the laser beams LB to the wafer 10 held on the chuck table 25 such that a plurality of processing marks is formed on the wafer 10. At this time, the chuck table 25 with the wafer 10 held thereon has already been positioned right below the condenser 61 of the laser application unit 6 through operation of the above-described feed mechanism 30. The position of the condenser 61 is next adjusted in the up-down direction (Z-axis direction) by operating an unillustrated moving mechanism such that the focal points of the laser beams LB condensed by the condenser 61 are located on the front surface 10a of the wafer 10.

Figure 4A:
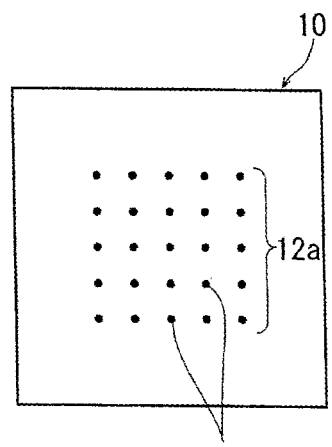
FIG. 4A is a concept diagram illustrating a desired positional relation defined by target processing positions in an adjustment method according to an embodiment of a first aspect of the present invention for the laser processing apparatus.

Here, the above-described positional relation 12a is, for example, a positional relation defined by twenty-five (5×5) target processing positions 14a arrayed at equal intervals of 10 μm in a space of 40 μm squares as viewed in plan on the front surface 10a of the wafer 10 as illustrated in FIG. 4A. In the control unit 100, the position information of the individual twenty-five target processing positions 14a has been stored beforehand. The spatial light modulator 65 is adjusted based on instruction signals sent from the spatial light modulator adjustment instructions section 110, whereby the laser beams LB are applied to form processing marks at the coordinate positions of the individual twenty-five target processing positions 14a. The spatial light modulator adjustment step and the processing mark formation step are performed based on the instruction signals from the spatial light modulator adjustment instruction section 110 and the processing mark formation instructions section 120 as described above, and as illustrated in FIG. 4B, processing marks 14b (which may hereinafter be referred to as "the actual processing marks 14b") are formed on the front surface 10a of the wafer 10 by the twenty-five laser beams LB.

As laser processing conditions to be instructed by the processing mark formation instructions section 120, the following conditions may be set, for example.

Figure 4B:
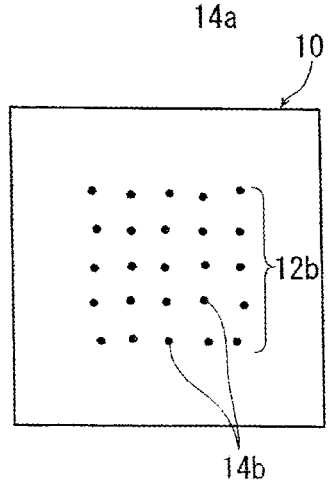
FIG. 4B is a concept diagram illustrating a positional relation defined by actual processing marks in the adjustment method.

Wavelengths of laser beams: 532 to 1,550 nm
Repetition frequency: 10 to 200 kHz
Average output: 0.1 to 10 W
Feed rate: 10 to 2,000 mm/sec Here, instruction signals have already been sent from the above-described spatial light modulator adjustment instructions section 110 to the spatial light modulator 65 such that the processing marks 14b to be formed on the front surface 10a of the wafer 10 will have the desired positional relation 12a illustrated in FIG. 4A. If the laser beams LB are precisely applied in accordance with the instructions, processing marks should be formed in conformity to the above-described desired positional relation 12a on the front surface 10a of the wafer 10. In reality, however, these processing marks do not conform to the desired positional relation 12a due to the aberration of the optical system. As illustrated in FIG. 4B, at least some of the processing marks 14b are formed displaced from the corresponding target processing positions 14a on the front surface 10a of the wafer 10, so that a positional relation 12b (which may hereinafter be referred to as "the actual positional relation 12b") disarrayed relative to the desired positional relation 12a is defined by the processing marks 14b. If laser processing is performed via the spatial light modulator 65 in such a state, the aberration is not corrected appropriately, thereby raising the problem that the aberration reduces the processing accuracy.

Therefore, in this embodiment, after performing the processing mark formation step, the operation of the laser oscillator 62 is first stopped, and the positional relation 12b which is defined by the actual processing marks 14b formed on the front surface 10a of the wafer 10 held on the chuck table 25 is imaged by the above-described camera 80 (imaging step). Image information that represents the positional relation 12b imaged in the imaging step is recorded in the memory (RAM) of the control unit 100.

When the imaging step has been performed, a comparison is made between the desired positional relation 12a used as a reference for the instructions in the spatial light modulator adjustment step and the actual positional relation 12b defined by the processing marks 14b imaged in the imaging step and recorded in the control unit 100, whereby positional deviations between the desired positional relation 12a and the actual positional relation 12b are detected. Based on the positional deviations so detected, the spatial light modulator 65 is adjusted such that the actual positional relation 12b is corrected to conform to the desired positional relation 12a, and the adjustment values used in the above-described adjustment are recorded in the control unit 100. The adjustment values are then reflected to the control of the spatial light modulator 65 by the control unit 100, whereby when performing laser processing by the laser application unit 6, a correction is performed to the aberration of the optical system of the laser application unit 6 including the condenser 61 (aberration correction step). As a consequence, the correction of the aberration of the optical system of the laser application unit 6 is appropriately made, thereby solving the problem that the processing accuracy is reduced by the aberration.

In the above-described embodiment, through the comparison between the desired positional relation 12a defined by the twenty-five target processing positions 14a and the actual positional relation 12b defined by the actually formed, twenty-five processing marks 25, the spatial light modulator 65 is adjusted to bring the actual positional relation 12b into conformity with the desired positional relation 12a. The present invention is however not limited to such a manner. For example, through respective comparisons between the individual ones of the twenty-five target processing positions 14a defining the desired positional relation 12a and the corresponding individual ones of the actually formed, twenty-five processing marks 14b, the spatial light modulator 65 may be adjusted to bring each actual processing mark 14b into registration with its corresponding target processing position 14a.

In the above-described embodiment, with the focal points of the laser beams LB positioned on the front surface 10a of the wafer 10 held on the chuck table 25, the laser beams LB are applied in the processing mark formation step to form the processing marks 14b on the front surface 10a, and the imaging step and the aberration correction step are then performed. The present invention is however not limited to such a manner. For example, with focal points positioned in the wafer 10, laser beams LB of a wavelength having transmissivity for the wafer 10 may be applied to form a plurality of processing marks in the wafer 10. If this is the case, the camera 80 only needs to be configured to include infrared ray application means and an infrared image pickup device such that the processing marks formed in the wafer 10 are detectable.

The present invention is not limited to the details of the above-described preferred embodiment. The scope of the invention is defined by the appended claims and all changes and modifications as fall within the equivalence of the scope of the claims are therefore to be embraced by the invention.

What is claimed is:

1. A laser processing apparatus comprising:
a chuck table that holds a workpiece;
a laser application unit that applies a laser beam to the workpiece held on the chuck table;
a feed mechanism that relatively feeds the chuck table and the laser application unit for processing; and
a control unit,
the laser application unit including
a laser oscillator that emits the laser beam,
a condenser that condenses and applies the laser beam that has been emitted from the laser oscillator to the workpiece held on the chuck table,
a spatial light modulator arranged between the laser oscillator and the condenser,
a spectrometer arranged between the condenser and the spatial light modulator, and
a camera arranged on a side toward which light reflected at the workpiece is split by the spectrometer,
the control unit including
a spatial light modulator adjustment instructions section configured to adjust the spatial light modulator into a state ready for splitting the laser beam that has been emitted from the laser oscillator, and applying a plurality of laser beams such that the laser beams will have a desired positional relation,
a processing mark formation instructions section configured to operate the laser oscillator to apply the laser beams to a wafer held as the workpiece on the chuck table such that a plurality of processing marks is formed at the wafer,
an imaging instructions section configured to stop the operation of the laser oscillator, and to image by the camera the processing marks formed at the wafer held on the chuck table, and
an aberration correction instructions section configured to correct aberration of the condenser by comparing the desired positional relation that has been instructed by the spatial light modulator adjustment instructions sections and a positional relation among the processing marks imaged by the camera, and adjusting the spatial light modulator such that the positional relation among the processing marks conforms to the desired positional relation.

2. An adjustment method of a laser processing apparatus including a chuck table that holds a workpiece, a laser application unit that applies a laser beam to the workpiece held on the chuck table, a feed mechanism that relatively feeds the chuck table and the laser application unit for processing, and a control unit,
the laser application unit including a laser oscillator that emits the laser beam, a condenser that condenses and applies the laser beam that has been emitted from the laser oscillator to the workpiece held on the chuck table, a spatial light modulator arranged between the laser oscillator and the condenser, a spectrometer arranged between the condenser and the spatial light modulator, and a camera arranged on a side toward which light reflected at the workpiece is split by the spectrometer, and
the control unit including
a spatial light modulator adjustment instructions section configured to adjust the spatial light modulator into a state ready for splitting the laser beam that has been emitted from the laser oscillator, and applying a plurality of laser beams such that the laser beams will have a desired positional relation,
a processing mark formation instructions section configured to operate the laser oscillator to apply the laser beams to a wafer held as the workpiece on the chuck table such that a plurality of processing marks is formed at the wafer,
an imaging instructions section configured to stop the operation of the laser oscillator, and to image by the camera the processing marks formed at the wafer held on the chuck table, and
an aberration correction instructions section configured to correct aberration of the condenser by comparing the desired positional relation that has been instructed by the spatial light modulator adjustment instructions sections and a positional relation among the processing marks imaged by the camera, and adjusting the spatial light modulator such that the positional relation among the processing marks conforms to the desired positional relation,
the adjustment method comprising:
a wafer providing step of providing, as the workpiece, the wafer held on the chuck table at which processing marks are to be formed by the application of the laser beam;
a holding step of holding the wafer on the chuck table;
a spatial light modulator adjustment step of adjusting the spatial light modulator into the state ready for splitting the laser beam that has been emitted from the laser oscillator, and applying the plurality of laser beams such that the laser beams will have desired positional relation;
a processing mark formation step of operating the laser oscillator to apply the laser beams to the wafer held on the chuck table such that a plurality of processing marks is formed at the wafer;
an imaging step of stopping the operation of the laser oscillator, and imaging by the camera the processing marks formed at the wafer held on the chuck table; and
an aberration correction step of correcting aberration of the condenser by comparing the desired positional relation that serves as a reference for the adjustment in the spatial light modulator adjustment step and a positional relation among the processing marks imaged in the imaging step, and adjusting the spatial light modulator such that the positional relation among the processing marks conforms to the desired positional relation.

* * * * *